United States Patent [19]

Granger

[11] Patent Number: 5,661,926

[45] Date of Patent: *Sep. 2, 1997

[54] CHRISTMAS TREE WATERING FUNNEL WITH INDICATING SYSTEM

[76] Inventor: Hugh A. Granger, P.O. Box 1399, Fullerton, Calif. 92633

[*] Notice: The term of this patent shall not extend beyond the expiration date of Pat. No. 5,410,839.

[21] Appl. No.: 639,201

[22] Filed: Apr. 26, 1996

[51] Int. Cl.⁶ .................................................. A47G 7/02
[52] U.S. Cl. ...................................... 47/40.5; 73/294
[58] Field of Search ............................... 47/40.1; 73/294

[56] References Cited

U.S. PATENT DOCUMENTS

| 28,637 | 6/1860 | Noyes | 73/294 |
|---|---|---|---|
| 1,472,961 | 11/1923 | Dean | 73/294 |
| 1,953,669 | 4/1934 | Bettes | 73/294 |
| 4,806,902 | 2/1989 | Gana | 73/294 |
| 5,410,839 | 5/1995 | Granger | 47/40.5 |
| 5,535,547 | 7/1996 | Brunengo | 47/40.5 |

Primary Examiner—Henry E. Raduazo
Attorney, Agent, or Firm—James G. O'Neill

[57] ABSTRACT

An apparatus for maintaining a water supply in a stand supporting a Christmas tree is provided. A rigid funnel body comprises integrally formed top, center, and bottom portions. The funnel has a frusto-conical cross-section that tapers from the top portion to the bottom portion. A flexible coupling is integrally formed between the portions of the funnel to hold them in a desired angular relationship. An indicating system is affixed to the top portion of the funnel. The indicating system indicates when the water supply in the stand has fallen below a desired minimum level. A water level device at the bottom portion of the funnel is coupled to the indicating device by a connecting member. The water level device actuates the indicating system.

20 Claims, 1 Drawing Sheet

CHRISTMAS TREE WATERING FUNNEL WITH INDICATING SYSTEM

BACKGROUND OF TE INVENTION

1. Field of the Invention

This invention relates generally to devices used for watering cut plants, and more particularly, to an improved apparatus for maintaining a water supply in a stand used to support a Christmas tree.

2. Description of Related Art

The inconveniences of watering Christmas trees supported in stands are well known. The breadth of branches surrounding the stand make it somewhat difficult to reach the stand for filling. Further, since the cut trees rapidly absorb water in the stand, the stand must be frequently re-filled.

A number of different prior art devices for watering Christmas trees have attempted to solve these inconveniences.

U.S. Pat. No. 5,076,009 to Cibor, discloses a Christmas tree watering system. The disclosed watering system includes an elevated reservoir connected to a sealed float valve assembly via tubing. The float valve assembly is strapped to the trunk of the tree to resist tilting. A float element is housed in a float body of the float valve assembly. The float element selectively enables filling of water in the Christmas tree stand from the water supply in the reservoir, to maintain a water level in the tree stand.

U.S. Pat. No. 4,850,137 to Foster, discloses a device for watering and removing water from a cut plant container. A collapsible bulb is retained in a funnel coupled to a tube. Water is added to the plant container through the tubing, via the funnel. The bulb can be compressed to draw water from the cut plant container into the bulb, for disposing of the water.

U.S. Pat. No. 5,054,236 to Sands, discloses a Christmas tree self-watering ornament. The disclosed device includes a reservoir coupled to a flexible conduit. A valve is located at a lowermost end of the conduit. The valve includes a check ball located between spaced webs for permitting selective passage of water through the conduit. The device further includes a fiber optic cable running through the conduit for enhanced use of the device as an ornament.

U.S. Pat. No. 4,930,252, discloses a Christmas tree waterer that includes a reservoir coupled to a water level monitor positioned in a stand. The water level monitor is electrically connected to a solenoid valve. When the water level in the stand falls below a desired level, the monitor triggers a switch to activate the solenoid to enable water to flow from the reservoir to the stand.

Additional plant maintenance devices are disclosed in U.S. Pat. No. 2,809,468 to Eliot, U.S. Pat. No. 1,586,676 to Heath, and U.S. Pat. No. 1,383,368 to Ambrose.

A disadvantage common to the prior art is that there are no means provided to indicate to the user that the water supply in a cut plant container, such as a Christmas tree stand, has fallen below a desired minimum level. A further disadvantage of the prior art is that there is no means to indicate to the user when the water supply level in a reservoir is low or empty.

There is, therefore, a need for an apparatus to indicate to the user that a water supply in,a cut plant container, such as a Christmas tree stand or reservoir, has fallen below a desired minimum level.

One such system which overcame the problems of the prior art was set forth in U.S. Pat. No. 5,410,839, granted to the inventor on May 2, 1995.

SUMMARY OF THE INVENTION

It is therefore an object of the present invention to provide an improved apparatus for maintaining a water supply in a cut plant container, such as a stand supporting a Christmas tree.

It is another object of the present invention to provide an apparatus for maintaining a water supply in a stand supporting a Christmas tree that indicates to a user that the water supply has fallen below a desired minimum level.

It is a further object of the present invention to provide an apparatus that provides facile refilling of a stand supporting a Christmas tree.

These and other objects and advantages of the present invention are achieved by providing an improved and simplified apparatus for maintaining a water supply in a stand supporting a Christmas tree. The invented apparatus includes a rigid funnel body comprising at least a top portion and a bottom portion. The top portion is coupled to the bottom portion with an integrally formed flexible coupling. The flexible coupling holds the top and bottom portions in a desired angular relationship. The funnel may further include a center portion extending between the top and bottom portions and integrally formed thereto with the flexible coupling. The funnel has a frusto-conical cross-section that tapers from the top portion to the bottom portion. The funnel provides facile filling and refilling of the stand.

The indicating system is affixed to the top portion of the funnel. The system works on an open and closed circuitry. When the system is closed, it will send a message to the top portion of the funnel indicating water supply in stand has fallen below desired minimum level.

A water level device may be connected to the indicating system. If connected, the water device will include means that floats on the surface of the water supply in the stand. As the water supply decreases, the float means moves a connecting member downwardly to operate circuitry to energize or deenergize the indicating system. The connecting member comprises a suitable connecting means that is unobtrusive to the viewing of the Christmas tree.

BRIEF DESCRIPTION OF TEE DRAWINGS

The objects and features of the present invention, which are believed to be novel, are set forth with particularity in the appended claims. The present invention, both as to it's organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified apparatus for maintaining a water supply in a cut plant container, such as a Christmas tree stand supporting a Christmas tree.

Figure 1:
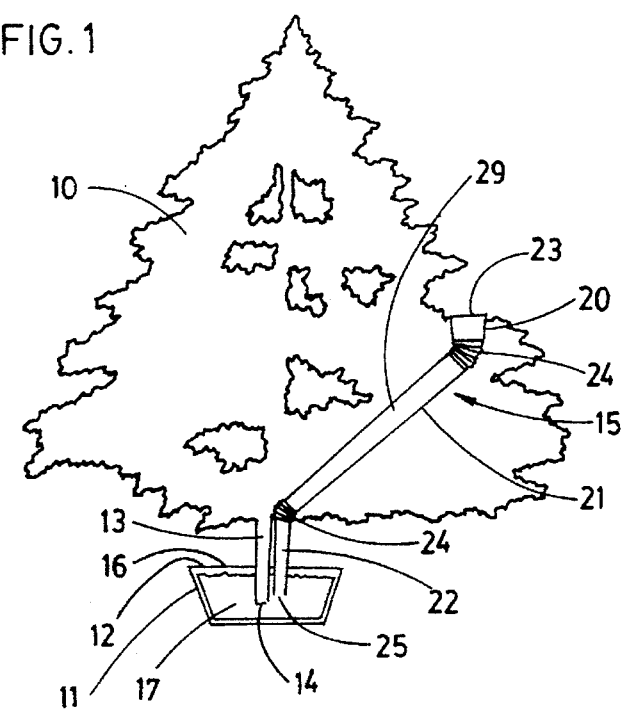
FIG. 1 is a front elevational view showing a preferred embodiment of the present invention secured to a Christmas tree.

Referring now to FIG. 1 of the drawings; there is shown a preferred embodiment of the invented apparatus 15 constructed according to the principals of the present invention. The apparatus 15 is shown secured to a Christmas tree 10 and extending into a stand 11. The apparatus 15 is secured to a trunk 13 of the tree 10- using well known means. The tree trunk 13 is secured in a cavity 12 of the stand 11, using any known means such as a spike 14.

The apparatus 15 comprises a hollow funnel body 29 with a top end or portion 20 and a bottom end or portion 22. A center portion 21 is used to couple top portion 20, and bottom portion 22, as by means of integrally formed flexible couplings 24.

Figure 2:
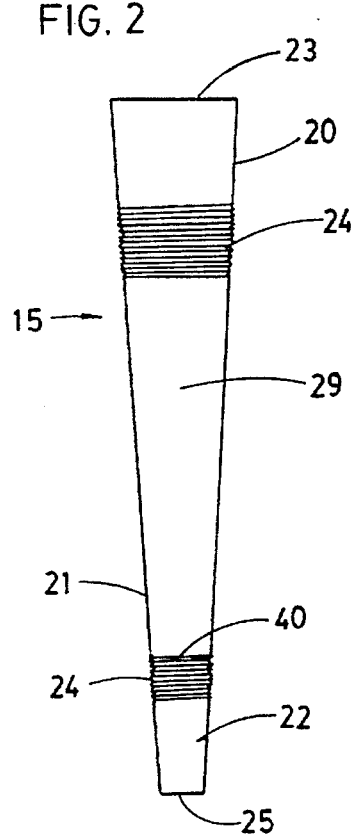
FIG. 2 is a front plan view showing a funnel body of the preferred embodiment.

Referring now to FIG. 2, there is shown the funnel body 29 of the present invention 15. The top 20, center 21, and bottom 22 portions of the funnel body 29, each comprise a substantially rigid, elongated portion having a frusto-conical cross-section, such that the funnel 15 tapers from the top portion 20 to the bottom portion 22. The funnel 15 may be fabricated using any suitable rigid, light material, such as plastic.

The funnel 15 may be fabricated to any suitable length to enable filling and refilling of the stand 11. Further, the top 20, center 21, and bottom 22 portions, may be fabricated to any desired individual length, depending upon intended use of the apparatus of the present invention 15. Optionally, the funnel body 29 may be configured with only the top 20 and bottom 22 portions, or may be constructed as one solid unit without the flexible couplings 24.

The top 20, center 21 and bottom 22 portions of the funnel 15 are held in any desired fixed angular relationship with the flexible couplings 2. The flexible couplings 24 comprise a suitable pliable portion of material that extends between the associated portions 20–21, 21–22 of the funnel 15, and may be integrally formed therewith. Preferably, the flexible couplings 24 are capable of holding the portions 20, 21 and 22 of the funnel 15 in a fixed angular relationship. In the preferred embodiment, each flexible coupling 24 comprises a series of expandable and contractible ribs 40. The ribs 40 extend horizontally between the associated portions 20–21, 21–22 of the funnel 15 and are made integral therewith.

Figure 3:
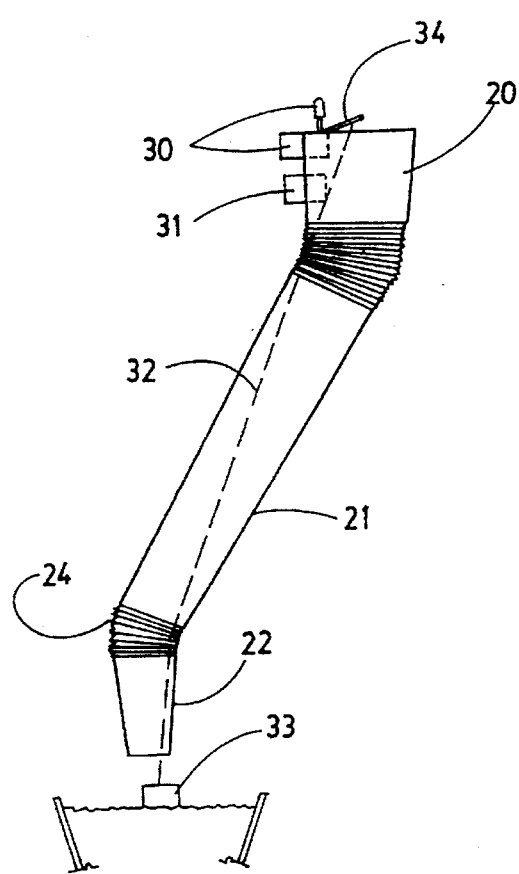
FIG. 3 is a side elevational view of the preferred embodiment of the present invention.

Referring now to FIG. 3 of the drawings, the preferred embodiment of the apparatus 15 of the present invention is shown with the top 20, center 21 and bottom 32 portions of the funnel 15 held in a fixed angular relationship by the flexible couplings 24.

An indicating system 30, 30A (best seen in FIGS. 3 or 4) is affixed to the top portion 20 of the funnel 15. A connecting member 32, 32A couples the indicating system 30, 30A to a water level device 33, 33A. The connecting member 32, 32A is dimensioned so that it extends between the indicating system 30, 30A and in case of the water level device 33 only, must be substantially taut.

In use, water is poured into an opening 23 in the funnel's top end 20. Water runs through the funnel 15 out of an opening 25 in the bottom end 22of the funnel 15, and into the stand's cavity 12 to form a water supply 17 in the stand 11. The cavity 12 is filled with water:until the water level reaches a desired level 16. If device 33 is used, it will be returned to water level 16, as explained more fully below.

The connecting member 32 may comprise any suitable strong connecting means. Preferably, the connecting member 32 comprises a connecting means, such as a transparent monofilament line, or the like, which is unobtrusive to viewing of the Christmas tree 10 in the preferred embodiment 15.

The water level device 33, such as a float means, is affixed permanently to the connecting member 32, and is positioned at bottom end 22 of funnel 15 through opening 25. The float means 33 may comprise any suitable buoyant material. As water level 16 decreases, connecting member 32 will be pulled by the descending float means 33 to trigger and energize the indicating system 30.

As the tree 10 absorbs water from supply 17, the water level 16 falls, causing float device 33 to move downwardly relative to the funnel 15. As the float device 33 moves downwardly it also draws the connecting member 32 downwardly. If enough of the water supply 17 is taken and the level 16 falls a predetermined amount, the connecting member 32 causes the indicating system 30 to be either de-energized or energized, depending on the type of switch 34 used, and how it is connected to power supply 31. For example, if switch 34 is normally open, this lowering of the water level will close the switch to actuate a light 30 in the indicating means to indicate to a user that the water supply 17 has fallen below the desired minimum level 16, and that the water supply 17 should be refilled. Or, if switch 34 is normally closed and operating a diode 30 to show water is present, this lowering of the water level will open the switch to either activate an other, such as a red light, and/or shut off the light 30 in the indicating means to indicate to a user that the water supply 17 has fallen below the desired minimum level 16, and that the water supply 17 should be refilled.

The water supply 17 is easily refilled by pouring water into the opening 23 in the funnel's top end 20. When the water supply 17 is full, the connecting member 32 will actuate switch 34 to return the indicating system 30 to its initial setting.

Figure 4:
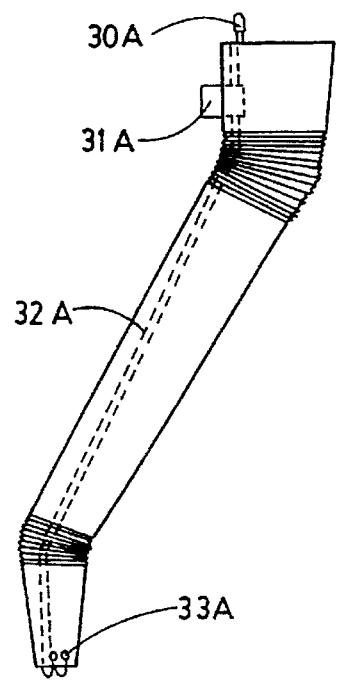
FIG. 4 is a side elevational view of the preferred embodiment with additional means of energizing indicating system.

Referring now to FIG. 4, the power supply 31A energizes indicating system 30A through connecting member 32A when the water level 16 is sufficiently high enough to contact or be above the electrical conductors 33A. It being understood, of course, that if the water level 16 falls below the electrical conductors 33A, that the indicating system will be disconnected or de-energized.

Thus there has bee described an improved and simplified apparatus for maintaining a water supply in a stand supporting a Christmas tree. The rigid funnel provides facile filling and refilling of the stand. The flexible coupling holds the portions of the funnel in a desired angular relationship. The indicating system will make a user aware that the water supply has fallen below a desired minimum level. When the water supply decreases below a desired minimum level, the connecting member will actuate the indicating system.

Those skilled in the art will appreciate that various adaptations and modification of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for maintaining a water supply in a stand supporting a cut plant comprising:

a conduit rigid along most of its length having a top portion integrally formed to a bottom portion, said top portion having a diameter greater than the diameter of the bottom portion;

a water level device extended through said bottom portion of said conduit; said water level device being attached to a connecting member so that it will reach to the level of said water supply in said stand;

an indicating mans affixed to the top portion of said conduit and coupled to said water level device, said indicating means being activated by movement of water to activate said water level device thereby activating said indicating means when the water supply in said stand drops below a desired minimum level; and said connecting member being affixed to said water level device and said indicating means for coupling said water level device to said indicating.

2. The apparatus of claim 1 wherein said water level device is coupled through said bottom portion of said conduit to said connecting member; said water level device includes a float body to preventing said water level device from sinking in said water supply; said float body remaining on the surface of the water supply, thus causing vertical movement of said connecting member to actuate the indicating means.

3. The apparatus of claim 1 wherein said indicating means further comprises:

circuitry comprising a micro switch coupled to a power supply; and a switch coupled to said power supply; said switch being coupled to said connecting member whereby both said switch and said connecting member are responsive to movement of said connecting member for actuating said switch.

4. The apparatus of claim 1 wherein the top portion of said conduit comprises a substantially rigid elongated portion having a frusto-conical cross-section and the bottom portion of said conduit comprises a substantially rigid elongated portion having a frusto-conical cross-section such that said conduit tapers from the top portion to the bottom portion; and said top portion of said conduit is coupled to said bottom portion of said conduit using a flexible coupling integrally formed therewith.

5. The apparatus of claim 4 wherein said flexible coupling is adapted to hold the top portion and the bottom portion of said conduit in a desired fixed angular relationship.

6. The apparatus of claim 4 wherein said conduit further includes an elongated substantially rigid center portion having a frusto-conical cross-section interposed between the top portion and the bottom portion thereof and flexibly coupled thereto using said flexible coupling; the top, center, and bottom portions of said conduit held in a desired fixed angular relationship by said flexible coupling.

7. The apparatus of claim 1 wherein said connecting member comprises a substantially thin portion of transparent monofilament line.

8. An apparatus for maintaining a water supply in a stand supporting a Christmas tree comprising:

an elongated funnel comprising top, center, and bottom portions, said funnel having a frusto-conical cross section that tapers from the top portion to the bottom portion, said top, center and bottom portions integrally formed together with flexible couplings, said flexible couplings holding the top, center and bottom portions of said funnel in a desired angular relationship;

monitoring means connected through the bottom portion of said funnel, said monitoring means monitoring the water supply level in said stand; and indicating means affixed to the top portion of said funnel and coupled to said monitoring means, said indicating means adapted to emit a signal, responsive to said monitoring means, when the water supply level in said stand falls below a desired minimum level.

9. The apparatus of claim 8 wherein said monitoring means consists of a water level device comprising a suitable electrical unit coupled through the bottom portion of said funnel and coupled to the connecting member, and said connecting member is coupled to said indicating means through said funnel body.

10. The apparatus of claim 9 wherein said indicating means comprises an indication system coupled to a power supply, and a water level indicating device coupled to the top end of said funnel, through said connecting member, whereby said water level indicating device responds to said water level to energize said indicating system.

11. The apparatus of claim 10 wherein said electrical unit includes a air of conductors secure to said bottom portion of said funnel.

12. The apparatus of claim 8 wherein said monitoring means consists of a water level indicating device comprising a pair of conductors coupled through the bottom portion of said funnel to the connecting member, and said connecting member is coupled to said indicating means through said funnel body.

13. The apparatus of claim 12 wherein said indicating means is coupled to a power supply, and said water level indicating device is coupled to the top end of said funnel, through said connecting member, whereby said water level indicating device responds to said water level to energize said indicating means.

14. An apparatus for maintaining a water supply in a stand supporting a Christmas tree comprising:

a funnel comprising at least a rigid top portion and a rigid bottom portion, said funnel having a frusto-conical cross-section such that said funnel tapers from the top portion to the bottom portion; said top portion and said bottom portion integrally formed together by a flexible coupling such that said flexible coupling holds said top portion and said bottom portion in a desired angular relationship;

an indicating means affixed to the top portion of said funnel; said indicating means including, an electrical circuit, an actuation means coupled to said electrical circuit, and a connecting member coupled to said actuation means; and a water level indicating device affixed to said connecting member through said bottom portion of said funnel said water level indicating device including a pair of conductors.

15. The apparatus of claim 14 wherein said flexible coupling comprises a series of expandable and contractible ribs extending between the top and bottom portions, and made integral therewith, said flexible coupling adapted to hold the top and bottom portions of said funnel in a desired fixed angular relationship.

16. The apparatus of claim 14 wherein said funnel further comprises an elongated substantially rigid center portion having a frusto-conical cross-section extending between the top portion and the bottom portion thereof and integrally formed therewith by a further flexible coupling; the top, center and bottom portions of said funnel held in a desired fixed angular relationship by the flexible couplings.

17. The apparatus of claim 14 wherein said connecting member comprises a substantially thin portion of transparent monofilament line.

18. The apparatus of claim 14 wherein said indicating means includes a power supply, a switch coupled to said power supply, an said pair of conductors is coupled to said switch and to said connecting member.

19. The apparatus of claim 14 wherein said pair of conductors are a monitoring means to indicate the water level in said stand.

20. The apparatus of claim 19 wherein said pair of conductors are coupled to a power supply, through said connecting member, whereby said pair of conductors responds to said water level to energize said indicating means.

* * * * *